United States Patent
Ishii et al.

(10) Patent No.: US 11,481,990 B2
(45) Date of Patent: Oct. 25, 2022

(54) DETECTION DEVICE, DETECTION METHOD, AND RECORDING MEDIUM FOR DETECTING AN OBJECT IN AN IMAGE

(71) Applicant: Panasonic Intellectual Property Corporation of America, Torrance, CA (US)

(72) Inventors: Yasunori Ishii, Osaka (JP); Takuya Yamaguchi, Osaka (JP); Yohei Nakata, Osaka (JP); Ryota Fujimura, Kanagawa (JP); Sotaro Tsukizawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 50 days.

(21) Appl. No.: 17/149,269

(22) Filed: Jan. 14, 2021

(65) Prior Publication Data

US 2021/0142087 A1    May 13, 2021

Related U.S. Application Data

(63) Continuation of application No. PCT/JP2019/048322, filed on Dec. 10, 2019.

(30) Foreign Application Priority Data

Jun. 10, 2019  (JP) .............................. JP2019-107892

(51) Int. Cl.
*G06V 10/22* (2022.01)
*G06V 10/94* (2022.01)
(Continued)

(52) U.S. Cl.
CPC .............. *G06V 10/22* (2022.01); *G06V 10/94* (2022.01); *G06V 20/52* (2022.01); *G06V 40/20* (2022.01)

(58) Field of Classification Search
CPC ........ G06V 10/22; G06V 10/94; G06V 20/52; G06V 40/20; G06V 10/62; G06V 10/75;
(Continued)

(56) References Cited

U.S. PATENT DOCUMENTS 9,383,261 B2 *  7/2016  Page ......................... G01J 4/04
2013/0034263 A1   2/2013  Ding et al.
(Continued)

FOREIGN PATENT DOCUMENTS

JP      2011-55262     3/2011
JP      2013-134703    7/2013
(Continued)

OTHER PUBLICATIONS

International Search Report (ISR) dated Mar. 17, 2020 in International (PCT) Application No. PCT/JP2019/048322.
Extended European Search Report dated Feb. 3, 2022 in corresponding European Patent Application No. 19907542.5.

*Primary Examiner* — Ming Y Hon
(74) *Attorney, Agent, or Firm* — Wenderoth, Lind & Ponack, L.L.P.

(57) ABSTRACT

An information processing device is an information processing device including a processor. The processor obtains a detection result of a first detector for detecting a first target in first sensing data; and based on the detection result of the first detector, determines a setting of processing by a second detector for detecting a second target in second sensing data next in an order after the first sensing data, the second target being different from the first target.

15 Claims, 9 Drawing Sheets

Related U.S. Application Data

(60) Provisional application No. 62/787,581, filed on Jan. 2, 2019.

(51) Int. Cl.
*G06V 20/52* (2022.01)
*G06V 40/20* (2022.01)

(58) Field of Classification Search
CPC ...... G06V 10/768; G06V 10/82; G06V 10/87; G06V 10/96; G06V 20/56; G06V 40/10; G06K 9/6227; G06K 9/6292; G06K 9/6271; G08G 1/166
See application file for complete search history.

(56) References Cited

U.S. PATENT DOCUMENTS

| | | | |
|---|---|---|---|
| 2015/0350518 A1* | 12/2015 | Lin | H04N 21/4431 725/110 |
| 2016/0227106 A1 | 8/2016 | Adachi | |
| 2017/0098132 A1* | 4/2017 | Yokota | G06T 7/194 |
| 2019/0114799 A1 | 4/2019 | Takahata | |
| 2019/0295275 A1* | 9/2019 | Himukashi | G06T 7/55 |
| 2020/0117906 A1* | 4/2020 | Lee | G06V 10/764 |
| 2020/0279127 A1* | 9/2020 | Han | G06V 20/10 |
| 2021/0019506 A1* | 1/2021 | Zhang | G06T 7/80 |

FOREIGN PATENT DOCUMENTS

| | | |
|---|---|---|
| JP | 2016-143157 | 8/2016 |
| WO | 2018/012084 | 1/2018 |

\* cited by examiner

DETECTION DEVICE, DETECTION METHOD, AND RECORDING MEDIUM FOR DETECTING AN OBJECT IN AN IMAGE

CROSS REFERENCE TO RELATED APPLICATIONS

This is a continuation application of PCT International Application No. PCT/JP2019/048322 filed on Dec. 10, 2019, designating the United States of America, which is based on and claims priority of U.S. Provisional Patent Application No. 62/787,581 filed on Jan. 2, 2019 and Japanese Patent Application No. 2019-107892 filed on Jun. 10, 2019. The entire disclosures of the above-identified applications, including the specifications, drawings and claims are incorporated herein by reference in their entirety.

FIELD

The present disclosure relates to an information processing device, an information processing method, and a recording medium.

BACKGROUND

As a technique for detecting an object in an image, a technique for improving the accuracy of object detection has been proposed. For example, PTL 1 discloses a technique in which a correspondence relationship between a feature of a response output by a detector and an optimal threshold is trained using a regression model, and the threshold is then switched in accordance with the feature of the response from the detector.

CITATION LIST

Patent Literature

PTL 1: U.S. Patent Application No. 2013/0034263

SUMMARY

Technical Problem

However, with the conventional technique disclosed in PTL 1, when the stated training of the correspondence relationship does not converge, an appropriate threshold value cannot be set, and erroneous detections or no detections may occur, i.e., the detection performance may drop. For example, with a single detector, the response may not stabilize depending on the case, such as the state of an object to be detected, i.e., the state of a target or the like. If the response does not stabilize, it is conceivable that the stated training of the correspondence relationship will not easily converge.

Accordingly, the present disclosure provides an information processing device, an information processing method, and a recording medium capable of stably improving the performance of object detection.

Solution to Problem

To address the above-described issue, an information processing device according to one aspect of the present disclosure is an information processing device including a processor. The processor is configured to: obtain a detection result of a first detector for detecting a first target in first sensing data; and based on the detection result of the first detector, determine a setting of processing by a second detector for detecting a second target in second sensing data next in an order after the first sensing data, the second target being different from the first target.

Additionally, an information processing device according to one aspect of the present disclosure is an information processing device including a processor. The processor is configured to: obtain a detection result of a first detector for detecting a first target in first sensing data; and based on the detection result of the first detector, (i) select one detection result among a detection result based on a processing result of a second detector for detecting a second target in second sensing data next in an order after the first sensing data and a detection result of the first detector in the second sensing data, the second target being different from the first target, or (ii) determine a way of integrating a detection result of the second detector and the detection result of the first detector in the second sensing data.

Additionally, an information processing method according to one aspect of the present disclosure is an information processing method to be executed by a computer, the method including: obtaining a detection result of a first detector for detecting a first target in first sensing data; and based on the detection result of the first detector, determining a setting of processing by a second detector for detecting a second target in second sensing data next in an order after the first sensing data, the second target being different from the first target.

Additionally, a recording medium according to one aspect of the present disclosure is a non-transitory computer-readable recording medium having a program for causing a computer to execute the above-described information processing method.

Advantageous Effects

According to the present disclosure, the performance of object detection can be stably improved.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
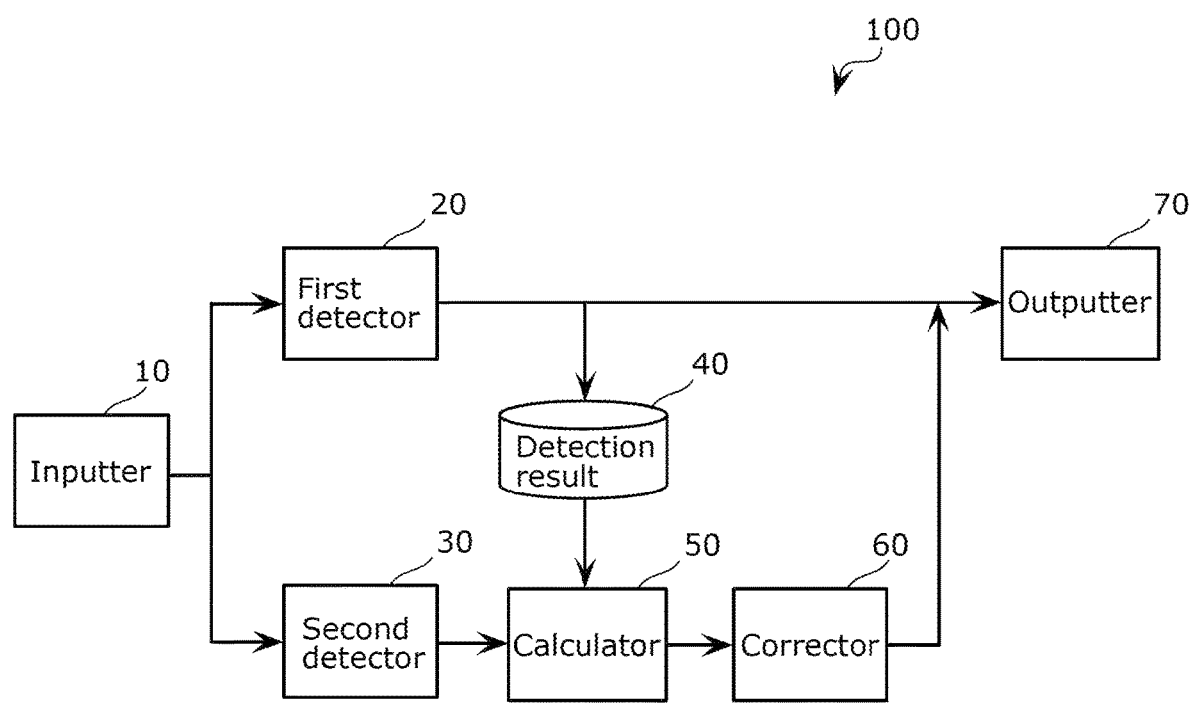
FIG. 1 is a block diagram illustrating an example of the configuration of an information processing device according to Embodiment 1.

DESCRIPTION OF EMBODIMENTS (Underlying Knowledge Forming Basis of the Present Disclosure)

Conventionally, in techniques that detect an object in an image, the object can be detected relatively well in any scene by training a machine learning model to detect local shape features of the object from a large number of training images having positive samples and negative samples with respect to the object to be detected. However, it is often the case that the detection sensitivity of the detector drops in situations that are susceptible to the effects of fluctuations in weather, lighting, and so on, as with images obtained from cameras used in outdoor environments, such as security cameras or in-vehicle cameras, for example. For example, in rainy conditions, there are situations where the object cannot be detected, due to light from lighting fixtures being reflected by puddles on a road surface and the vertical width of an object candidate frame extending in the direction of the road surface, or due to whiteouts.

Furthermore, even if, for example, the same type of object is to be detected, the object may be difficult to detect depending on the orientation or posture of the object. For example, when a pedestrian has fallen down, the fallen pedestrian (i.e., the pedestrian who is now in a lying posture) is often erroneously detected as the shadow of a pedestrian. In this manner, there are situations where even the same object to be detected is difficult to detect.

Although increasing the number of hidden layers of a machine learning model is known as a way to increase the detection accuracy of a detector, when, for example, the detector is implemented in an embedded device such as an in-vehicle camera system, there are limits to processing amounts, which makes it difficult to increase the processing amount for the detector.

After diligently examining the above-described issue, the inventors of the present disclosure found that the performance of object detection can be stably improved by, for example, using two detectors and, based on a detection result from one detector, determining settings for a threshold or processing by a detection model or the like of the other detector.

An overview of one aspect of the present disclosure is as follows.

An information processing device according to one aspect of the present disclosure is an information processing device including a processor. The processor is configured to: obtain a detection result of a first detector for detecting a first target in first sensing data; and based on the detection result of the first detector, determine a setting of processing by a second detector for detecting a second target in second sensing data next in an order after the first sensing data, the second target being different from the first target.

Through this, the setting of the processing by the second detector for detecting the second target in the second sensing data can be determined based on prior information indicating that the first target has been detected in the first sensing data prior to the second sensing data. The detection accuracy of the second target in the second sensing data, i.e., the detection target, can therefore be increased. Accordingly, the detection performance can be improved in a stable manner.

For example, in an information processing device according to one aspect of the present disclosure, the processor may determine the setting of the processing by the second detector based on a relationship between the detection result of the first detector and a candidate for a detection result of the second detector.

Through this, a candidate for a detection result of the second detector is used in addition to the detection result of the first detector, and thus the setting of the processing by the second detector can be executed more appropriately. The detection accuracy of the second target in the second sensing data can therefore be increased even more.

For example, in an information processing device according to one aspect of the present disclosure, the relationship may be a distance between a region of the first target detected by the first detector and a candidate region of the second target detected by the second detector.

Through this, the second target can be detected based on a similarity between the first target detected in the first sensing data and the second target detected in the second sensing data next in order after the first sensing data. The second target can therefore be detected with greater accuracy.

For example, in an information processing device according to one aspect of the present disclosure, the processor may determine the setting of the processing by the second detector in accordance with whether or not the first target has been detected in the first sensing data.

Through this, the setting of the processing by the second detector can be determined in accordance with whether or not the first target has been detected in the first sensing data, and it is therefore easier to maintain the detection performance in a stable manner.

For example, in an information processing device according to one aspect of the present disclosure, the processor may determine the setting of the processing by the second detector in accordance with whether or not the first target has been detected in the second sensing data.

Through this, the setting of the processing by the second detector can be determined based on information indicating whether or not the first target has been detected in the second sensing data next in order after the first sensing data, in addition to prior information indicating whether or not the first target has been detected in the first sensing data. The detection accuracy for the second target can therefore be increased even more.

For example, in an information processing device according to one aspect of the present disclosure, the processor may determine the setting of the processing by the second detector when the first target is detected in the first sensing data.

Through this, the setting of the processing by the second detector for detecting the second target in the second sensing data can be determined based on prior information indicating that the first target has been detected in the first sensing data prior to the second sensing data. The detection accuracy of the second target in the second sensing data can therefore be increased.

For example, in an information processing device according to one aspect of the present disclosure, the processor may determine the setting of the processing by the second detector when the first target is furthermore not detected in the second sensing data.

Through this, the setting of the processing by the second detector for detecting the second target in the second sensing data can be determined based on information indicating that the first target has not been detected in the second sensing data next in order after the first sensing data, in addition to prior information indicating that the first target has been detected in the first sensing data. The detection accuracy for the second target can therefore be increased even more.

For example, in an information processing device according to one aspect of the present disclosure, the processor may determine the setting of the processing by the second detector when the first target is no longer detected in the first sensing data.

Through this, the setting of the processing by the second detector for detecting the second target in the second sensing data can be determined based on information indicating that the first target is no longer detected in the first sensing data. The detection accuracy for the second target can therefore be increased even more.

For example, in an information processing device according to one aspect of the present disclosure, the setting of the processing may be a parameter used in the processing. More specifically, the parameter used in the processing may be a likelihood threshold, a correction value of a likelihood, or a tracking threshold that is a number of data for determining whether a detection has been made, for the second target.

Through this, the detection sensitivity of the second detector with respect to the second target can be increased.

For example, in an information processing device according to one aspect of the present disclosure, the setting of the processing may be a calculation resource allocated to the processing by the second detector.

Through this, the calculation resource allocated to the processing by the second detector can be determined in accordance with the detection result of the first target in the first sensing data, and thus a detection model having a high processing amount can be switched to when it is necessary to increase the detection sensitivity with respect to the second target. This makes it possible to increase the processing performance of the second detector while reducing a processing amount.

For example, in an information processing device according to one aspect of the present disclosure, the setting of the processing may be the second detector being selected. For example, the setting of the processing may be a resolution, a size, or a framerate of data input to the second detector.

Through this, the detection performance of the second detector can be increased.

For example, in an information processing device according to one aspect of the present disclosure, the first target and the second target may be objects having a same type and having a different posture.

Through this, by detecting objects which have different postures but are of the same type, as is the case with the first target and the second target, a drop in detection sensitivity due to posture differences can be reduced.

Additionally, an information processing device according to one aspect of the present disclosure is an information processing device including a processor. The processor is configured to: obtain a detection result of a first detector for detecting a first target in first sensing data; and based on the detection result of the first detector, (i) select one detection result among a detection result based on a processing result of a second detector for detecting a second target in second sensing data next in an order after the first sensing data and a detection result of the first detector in the second sensing data, the second target being different from the first target, or (ii) determine a way of integrating a detection result of the second detector and the detection result of the first detector in the second sensing data.

Through this, when the detection accuracy of the first detector is unstable, the processing performed by the second detector on the second sensing data is determined based on the detection result of the first detector in the first sensing data. Accordingly, when the first detector cannot accurately detect the first target in the second sensing data, the detection result of the first detector in the second sensing data can be complemented using the detection result based on the above-described processing result of the second detector.

For example, in an information processing device according to one aspect of the present disclosure, the processor may: calculate a degree of change between a detection result of the first target in the first sensing data and a detection result of the first target in the second sensing data; and execute (i) or (ii) based on the degree of change. For example, the degree of change may be a degree of change in a specific direction in sensing data between the detection result of the first target in the first sensing data and the detection result of the first target in the second sensing data, and in accordance with the degree of change in the specific direction, the processor may: select one detection result among the detection result based on a processing result of the second detector and the detection result of the first detector in the second sensing data in (i), or determine a weight of the integrating of the detection result of the second detector and the detection result of the first detector in (ii).

Through this, an importance of the detection result of the second detector in the detection processing for the first target can be switched based on variations in the detection result of the first detector. The detection accuracy for the first target can therefore be increased.

For example, in an information processing device according to one aspect of the present disclosure, the first target and the second target may be objects which are of a same type but are different parts.

Through this, a candidate frame presumed to correspond to the candidate frame of the first target can be generated by extending (e.g., increasing by X times) the candidate frame of the second target in the vertical direction. For example, when the detection result of the first target is unstable, the detection result of the first target can be compensated for by using the detection result of the second target, and thus a drop in the detection accuracy of the first target can be reduced.

Additionally, an information processing method according to one aspect of the present disclosure is a method for causing a computer to execute: obtaining a detection result of a first detector for detecting a first target in first sensing data; and based on the detection result of the first detector, determining a setting of processing by a second detector for detecting a second target in second sensing data next in an order after the first sensing data, the second target being different from the first target.

Through this, the setting of the processing by the second detector for detecting the second target in the second sensing data can be determined based on prior information indicating that the first target has been detected in the first sensing data prior to the second sensing data. The detection accuracy of the second sensing data can therefore be increased.

Additionally, a recording medium according to one aspect of the present disclosure is a non-transitory computer-readable recording medium having a program for causing a computer to execute the above-described information processing method.

Embodiments of the present disclosure will be described hereinafter with reference to the drawings.

Note that the following embodiments describe comprehensive or specific examples of the present disclosure. The numerical values, shapes, constituent elements, arrangements and connection states of constituent elements, steps, orders of steps, and the like in the following embodiments are merely examples, and are not intended to limit the present disclosure. Additionally, of the constituent elements in the following embodiments, constituent elements not denoted in the independent claims will be described as optional constituent elements.

Additionally, the drawings are schematic diagrams, and are not necessarily exact illustrations. As such, the scales and so on, for example, are not necessarily consistent from drawing to drawing. Furthermore, configurations that are substantially the same are given the same reference signs in the drawings, and redundant descriptions will be omitted or simplified.

Additionally, in the present specification, terms indicating relationships between elements, such as "horizontal" or "vertical", and numerical value ranges do not express the items in question in the strictest sense, but rather include substantially equivalent ranges, e.g., differences of several percent, as well.

Embodiment 1

An information processing device according to Embodiment 1 will be described hereinafter.

Configuration

FIG. 1 is a block diagram illustrating an example of the configuration of information processing device 100 according to Embodiment 1. As illustrated in FIG. 1, information processing device 100 is configured including inputter 10, first detector 20, second detector 30, detection result storage 40, calculator 50, corrector 60, and outputter 70.

Information processing device 100 may be realized by a computer configured including a processor and memory, for example. In this case, each constituent element of information processing device 100 may be realized by the processor executing at least one program stored in the memory. Additionally, information processing device 100 may be realized by a plurality of computers, each configured including a processor and memory and being capable of communicating with each other, operating cooperatively. In this case, each constituent element of information processing device 100 may be realized by at least one of the processors executing at least one program recorded in at least one of the memories. Here, the descriptions will assume that information processing device 100 is realized by a computer configured including a processor and memory.

Inputter 10 obtains at least one instance of sensing data, and inputs the obtained sensing data to first detector 20 and second detector 30. Inputter 10 may obtain the sensing data from a sensor or a recording medium communicably connected over a wire or wirelessly, for example. Here, the descriptions will assume that the at least one instance of sensing data is at least one image captured by an image capturing device including an image sensor.

For example, inputter 10 obtains the image from the image capturing device, and inputs the obtained image into each of first detector 20 and second detector 30. Inputter 10 may obtain a moving image constituted by a plurality of images and input each image into each of first detector 20 and second detector 30.

Information processing device 100 obtains a detection result of first detector 20, which detects a first target ("first detection target" hereinafter) in a first image, and based on the detection result of first detector 20, determines a setting of processing by second detector 30 for detecting a second target ("second detection target" hereinafter), which is different from the first detection target, in a second image next in order after the first image. The second image may be an image of the next frame after the first image, or may be an image two or more frames after the first image. In other words, in a series of images, the second image may be the next image after the first image in terms of time, or the next image after the first image in an order in which the images are supplied for detection processing.

First detector 20 and second detector 30 both detect a detection target in each of a plurality of images. First detector 20 is a machine learning model trained, using machine learning, to detect the first detection target in an image. Additionally, second detector 30 is a machine learning model trained, using machine learning, to detect the second detection target in an image. First detector 20 and second detector 30 may be mutually-different machine learning models, or may be a single machine learning model.

The first detection target and the second detection target are objects which are of the same type but have different postures. The second detection target may be an object which is more difficult to detect than the first detection target, i.e., an object in an posture prone to erroneous detection. For example, the first detection target is a person in a standing posture, and the second detection target is a person in a lying posture. These people may be the same person, or may be different people.

Detection result storage 40 stores the detection result of first detector 20. In this detection result, the image input to first detector 20 is associated with information such as a likelihood of a detection frame detected in the image with respect to the first detection target, coordinates of the detection frame in the image, the size of the detection frame, a variation in the size of the detection frame from image to image, and so on. The information stored in detection result storage 40 is not limited to the detection result of the image in which the first detection target is detected, and the detection results of all images on which first detector 20 has executed detection processing may be stored as well.

Calculator 50 reads out the detection result of first detector 20 from detection result storage 40, and calculates information for determining a setting of processing by second detector 30. For example, calculator 50 obtains information of a candidate of a region (i.e., a candidate frame) of the second detection target detected by second detector 30. Then, calculator 50 calculates a relationship between the obtained detection result of first detector 20 and the candidate detection result of second detector 30. To be more specific, when the first detection target has been detected in the first image, calculator 50 calculates a distance between a region of the first detection target (i.e., a detection frame) detected by first detector 20 and the candidate frame of the second detection target detected by second detector 30. This distance is, for example, an overlap ratio or a distance between centers of the region of the first detection target detected in the first image by first detector 20 and the candidate frame of the second detection target detected in the second image by second detector 30.

Based on the detection result of first detector 20 (i.e., based on a result of the calculation by calculator 50), corrector 60 determines a setting of the processing by second detector 30 for detecting the second detection target in the second image. The setting of the processing is a parameter used in the processing by second detector 30. The parameter used in the processing is, for example, a likelihood threshold for the second detection target, a correction degree for the likelihood, or a tracking threshold, which is a number of data for determining a detection. Corrector 60 may determine the setting of the processing by second detector 30 based on a relationship between the detection result of first detector 20 and the candidate detection result of second detector 30. As described above, this relationship is a distance between a region of the first detection target detected by first detector 20 and a candidate region of the second detection target detected by second detector 30.

Hereinafter, the present embodiment will describe the parameter used in the processing by second detector 30 as being a likelihood threshold for the second detection target (also called simply a "threshold" hereinafter).

Corrector 60 determines the threshold of second detector 30 in accordance with whether or not the first detection target has been detected in the first image. Corrector 60 may furthermore determine the threshold of second detector 30 in accordance with whether or not the first detection target has been detected in the second image. For example, when the first detection target is detected in the first image, corrector 60 may determine the threshold of second detector 30 so that a probability that the second detection target will be detected in the second image increases. Additionally, for example, when the first detection target is detected in the first image and the first detection target is not detected in the second image, corrector 60 may determine the threshold of second detector 30 so that a probability that the second detection target will be detected in the second image increases. Corrector 60 outputs the determined threshold of second detector 30 to second detector 30.

Second detector 30 obtains and updates the threshold determined by corrector 60. When the threshold is updated, second detector 30 detects the second detection target in the second image based on the updated threshold. Second detector 30 outputs a detection result obtained by updating the threshold to outputter 70.

Although second detector 30 obtains and updates the threshold determined by corrector 60 in the foregoing example, at this time, corrector 60 may input the determined threshold to a conversion table, correct the detection result of second detector 30, and output the corrected detection result to outputter 70.

Outputter 70 outputs the detection result of first detector 20 and the detection result of second detector 30 for each image. Outputter 70 may output these detection results to a presenter (not shown), or may output the detection results to a device aside from information processing device 100, For example, outputter 70 may cause the presenter to present information based on the detection results, based on a user operation input to an operation interface (not shown). The operation interface is, for example, a keyboard, a mouse, a touch panel, a button, a microphone, or the like. The presenter is, for example, a display, a speaker, or the like. Note that information processing device 100 may or may not include the operation interface and the presenter. The operation interface and the presenter may be provided in another device aside from information processing device 100, for example. The other device aside from information processing device 100 may be, for example, an information terminal such as a smartphone, a tablet, a computer, or the like. Additionally, although information processing device 100 has been described as a computer as an example, information processing device 100 may be provided in a server connected over a communication network such as the Internet.

Operations

Figure 2:
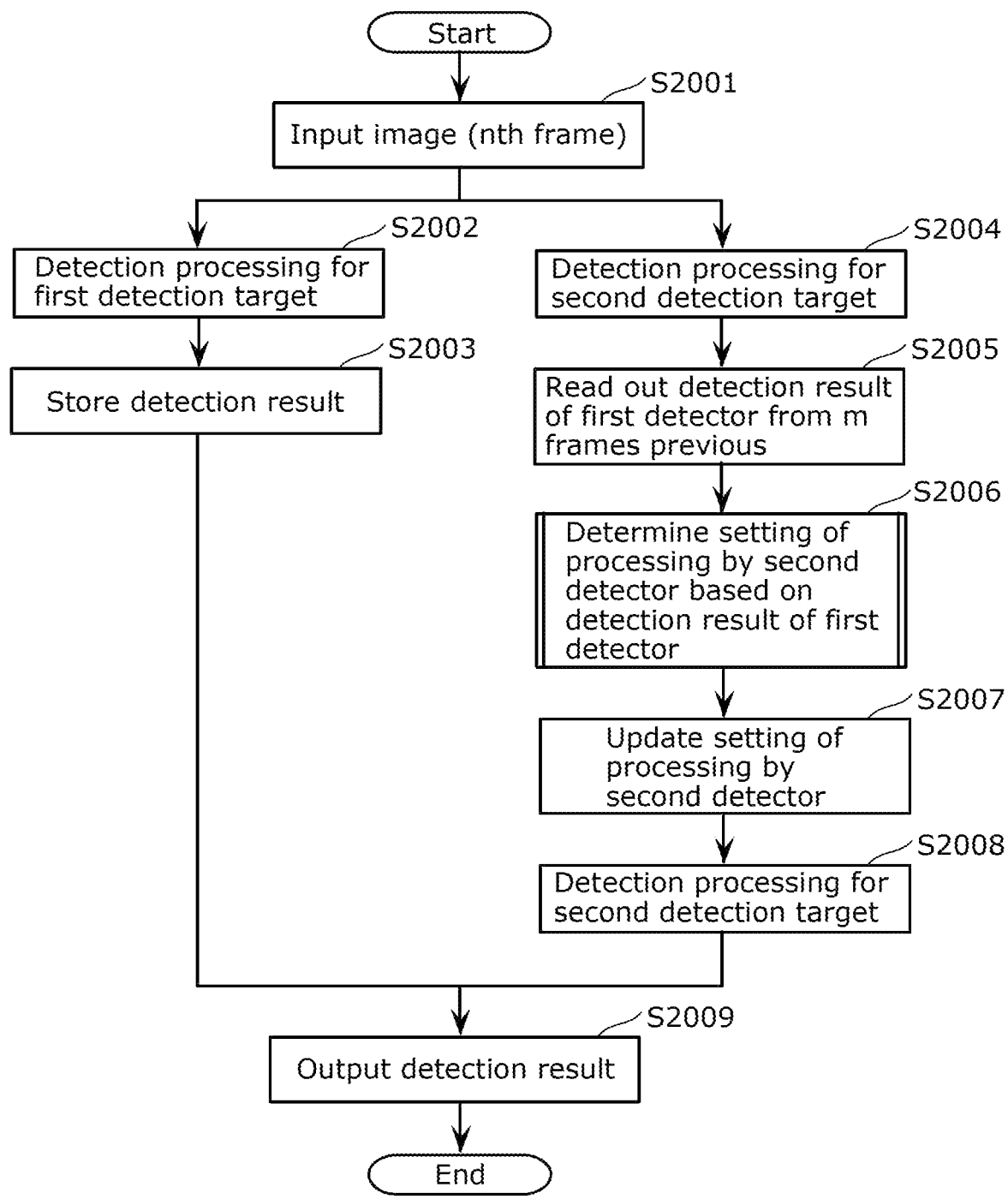
FIG. 2 is a flowchart illustrating an example of operations performed by the information processing device according to Embodiment 1.
Figure 3:
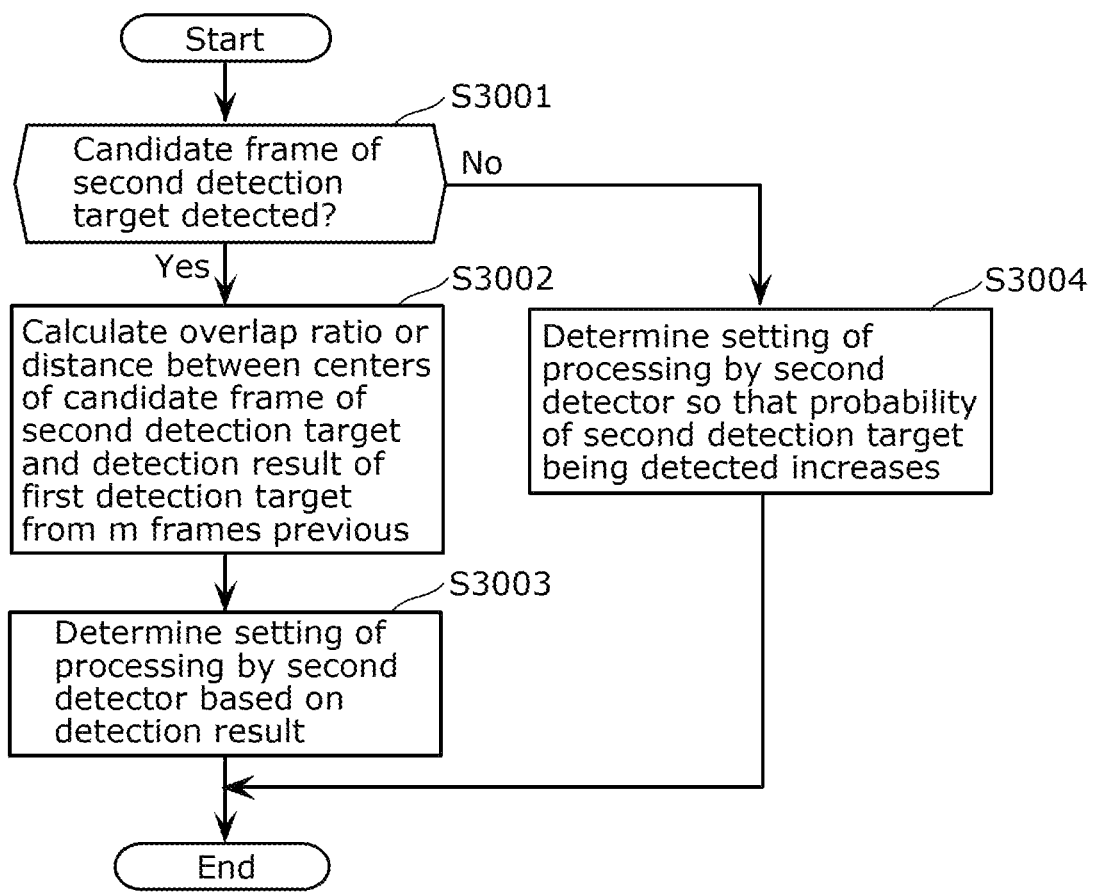
FIG. 3 is a flowchart illustrating details of processing of step S2006 in FIG. 2.
Figure 4:
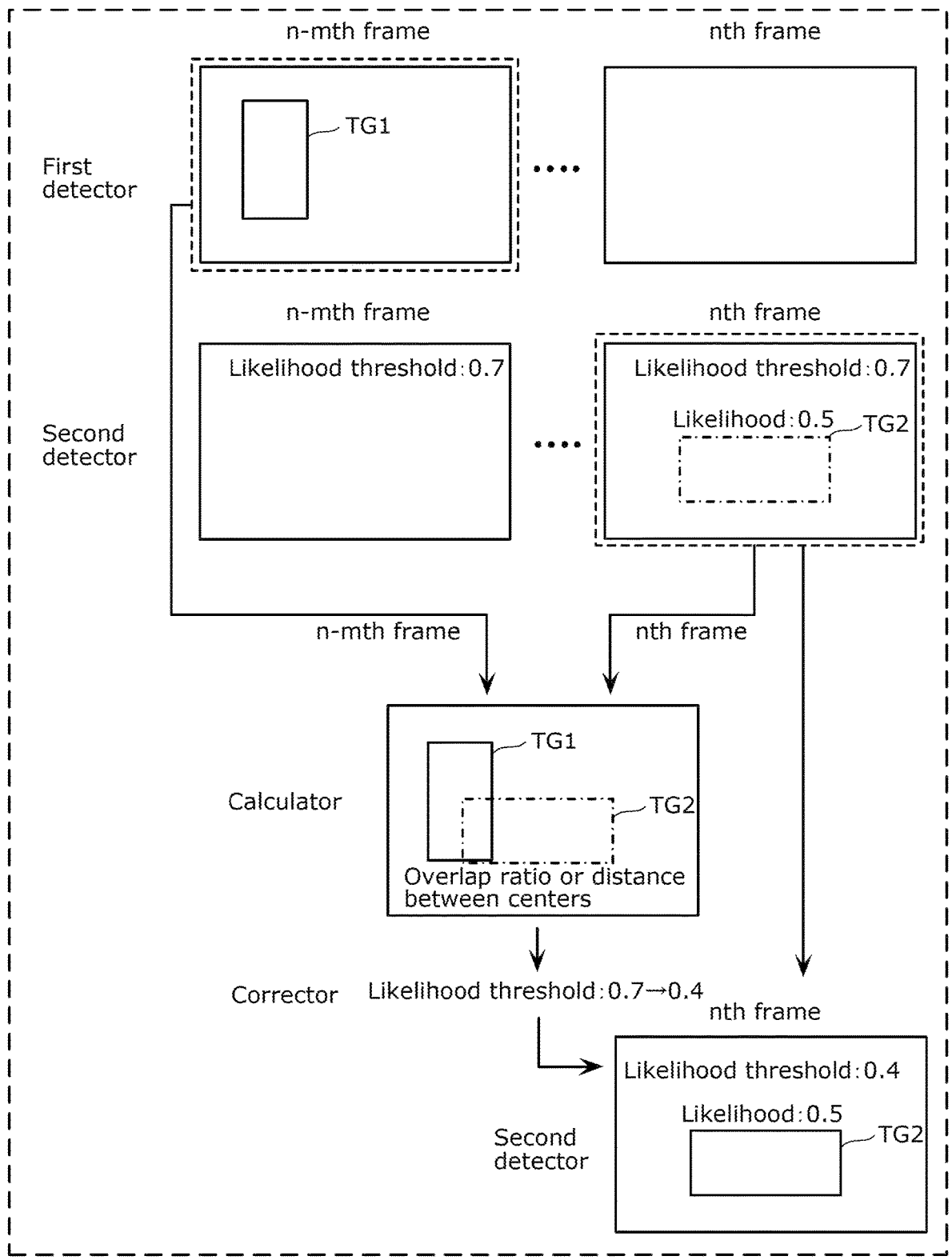
FIG. 4 is a diagram schematically illustrating an example of operations of the information processing device according to Embodiment 1.

An example of operations of information processing device 100 according to Embodiment 1 will be described next with reference to FIG. 2 to FIG. 4. FIG. 2 is a flowchart illustrating an example of operations performed by information processing device 100 according to Embodiment 1. FIG. 3 is a flowchart illustrating details of processing of step S2006 in FIG. 2. FIG. 4 is a diagram schematically illustrating an example of operations of information processing device 100 according to Embodiment 1.

Information processing device 100 obtains a moving image from a sensor such as an image sensor, for example, and inputs a plurality of images included in the moving image into first detector 20 and second detector 30. First detector 20 detects the first detection target in the input image, and second detector 30 detects the second detection target, which is different from the first detection target, in the input image.

Here, as illustrated in FIG. 2 and FIG. 4, information processing device 100 describes an example of processing an image of an nth (where n is an integer of at least 2) frame out of the plurality of images.

As illustrated in FIG. 2, information processing device 100 inputs the image of the nth frame ("second image" hereinafter), among the plurality of images obtained from the sensor, into first detector 20 and second detector 30 (step S2001). As described above, first detector 20 and second detector 30 are both machine learning models, and are convolutional neural networks, for example.

First detector 20 executes detection processing for the first detection target in the second image (step S2002). At this time, first detector 20 detects a plurality of candidate frames in the input second image, and calculates a likelihood for the first detection target in each of the detected candidate frames. First detector 20 determines whether or not the likelihood for the first detection target is at least a threshold for each candidate frame, and of the candidate frames that are at least the threshold, determines, for example, the candidate frame having a maximum likelihood as the detection frame of the first detection target.

Next, first detector 20 stores the detection result in detection result storage 40 (step S2003). In the example in FIG. 4, the first detection target is detected in an n-mth (1≤m<n) frame ("first image" hereinafter), and the first detection target is not detected in the nth frame ("second image" hereinafter). In this case, first detector 20 associates, for example, information indicating that the first detection target has been detected in the first image with the first image and information such as coordinates, a size, a likelihood, or the like of detection frame TG1 of the first detection target, and stores these items in detection result storage 40. Note that first detector 20 may store information indicating, for example, that the first detection target has not been detected in the second image, in detection result storage 40.

Operations of second detector 30 will be described next. Second detector 30 executes detection processing for the second detection target in the second image (step S2004). At this time, second detector 30 detects a plurality of candidate frames in the input second image, and calculates a likelihood for the second detection target in each of the detected candidate frames. Second detector 30 determines whether or not the likelihood for the second detection target is at least a threshold for each candidate frame, and of the candidate frames that are at least the threshold, determines, for example, that the candidate frame having a maximum likelihood is the second detection target. In the example illustrated in FIG. 4, second detector 30 detects a candidate frame indicating a predetermined likelihood (e.g., 0.5) for the second detection target in the second image. However, the candidate frame is lower than the threshold, and thus the candidate frame is determined not to be the second detection target.

Calculator 50 reads out, from detection result storage 40, the detection result of first detector 20 from m frames previous (i.e., the first image) (step S2005). At this time, when a flag indicating that the first detection target has been detected is added to the read-out first image, calculator 50 calculates information for determining the setting of the processing by second detector 30 on the basis of the detection result of first detector 20. The information for determining the setting of the processing may be, for example, pixel values, a size, or coordinates of a region indicating the first detection target in the first image, pixel values in the periphery of the region, or the like.

Corrector 60 determines the setting of the processing by second detector 30 based on the detection result of first detector 20 (step S2006). In other words, corrector 60 determines the setting for the processing by second detector 30 based on the information calculated by calculator 50 on the basis of the detection result of first detector 20. Note that the setting of the processing and the parameter used in the processing have been described above, and will therefore not be described here. Here, as illustrated in FIG. 4, the setting of the processing by second detector 30 is the likelihood threshold for the second detection target. In the example illustrated in FIG. 4, the likelihood threshold is corrected to 0.4 from 0.7.

The processing of step S2006 will be described in more detail with reference to FIG. 3 and FIG. 4.

For example, as illustrated in FIG. 4, when the first detection target has been detected in the first image and the candidate frame for the second detection target has been generated in the second image (Yes in step S3001 of FIG. 3), calculator 50 calculates an overlap ratio or a distance between centers of a region indicating the first detection target detected in the first image (i.e., the detection frame of the first detection target) and the candidate frame for the second detection target detected in the second image (step S3002 in FIG. 3). Note that the above-described processing may be executed for all of the generated candidate frames, or the above-described processing may be executed only for candidate frames having at least a predetermined likelihood (e.g., 0.5).

Next, corrector 60 determines the setting of the processing by second detector 30 based on the detection result of step S3002 (step S3003). Although not illustrated in FIG. 2 and FIG. 3, corrector 60 corrects the setting of the processing by outputting, to second detector 30, the determined setting of the processing by second detector 30.

Although not illustrated in FIG. 4, for example, when the first detection target is detected in the first image and a detection frame having the predetermined likelihood with respect to the second detection target is not detected in the second image (No in step S3001 of FIG. 3), corrector 60 determines the setting of the processing by the second detector 30 so that the probability of the second detection target being detected increases (step S3004). For example, corrector 60 may determine the likelihood threshold of second detector 30 with reference to a probability value calculated by calculator 50, so that the probability the second detection target is detected in the second image increases.

The flow of processing from step S2006 and on will be described next with further reference to FIG. 2.

Second detector 30 obtains and updates the setting of the processing determined by corrector 60 (step S2007). In the example illustrated in FIG. 4, second detector 30 updates the likelihood threshold to 0.4.

Next, based on the updated setting of the processing, second detector 30 performs the detection processing for the second detection target in the second image (step S2008). In the example illustrated in FIG. 4, second detector 30 detects the second detection target in the second image based on the updated likelihood threshold of 0.4. Through this, a candidate frame having a predetermined threshold (0.5) for the second detection target in the second image is determined to be a candidate frame indicating the second detection target, based on the likelihood threshold of 0.4. In other words, the candidate frame is output as the detection result for the second detection target, i.e., detection frame TG2.

Outputter 70 obtains the detection results from first detector 20 and second detector 30, and outputs information indicating the obtained detection results (e.g., coordinates and likelihoods of the candidate frames) (step S2009).

[Variation 1]

Figure 5:
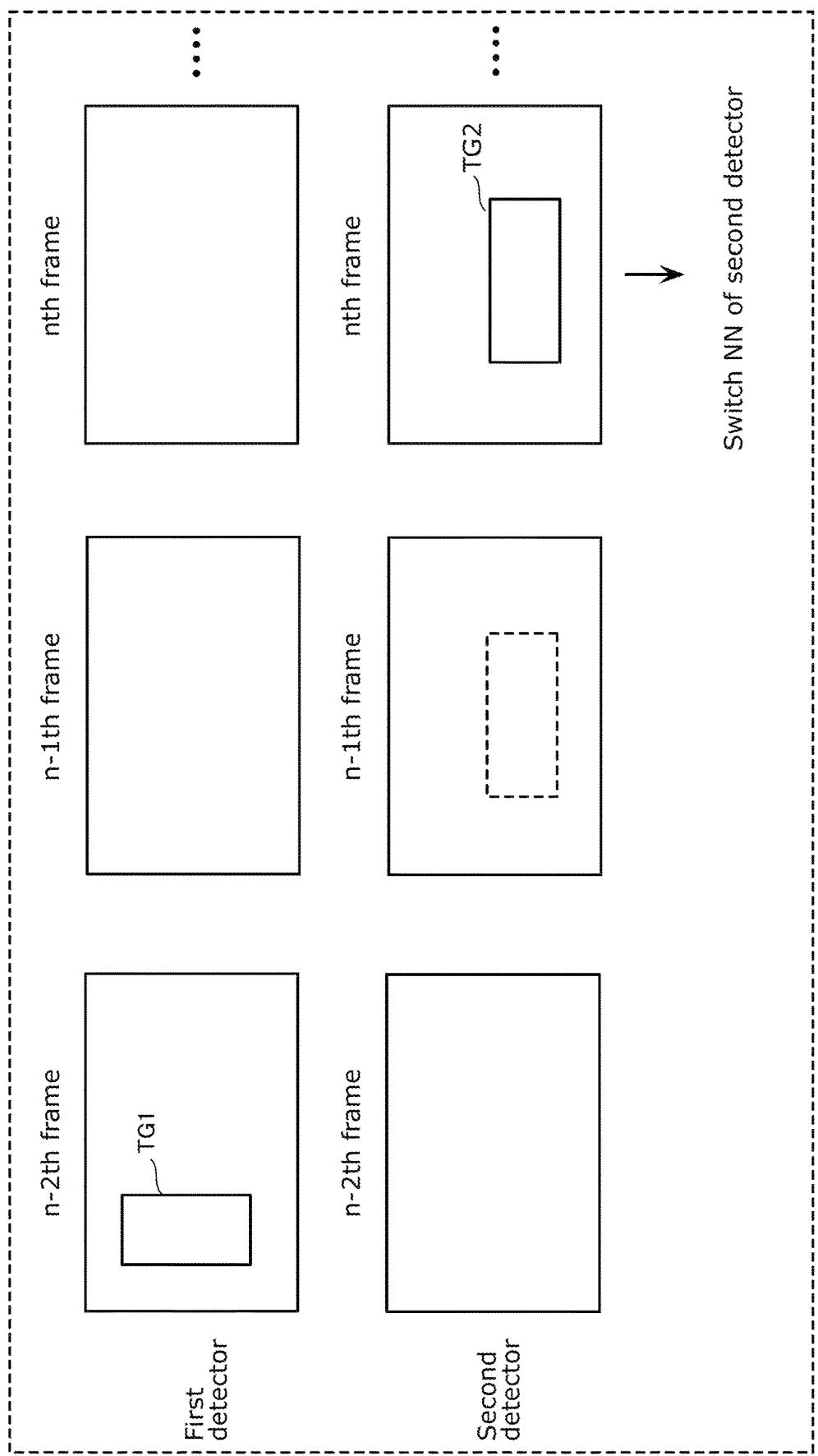
FIG. 5 is a diagram schematically illustrating an example of operations of an information processing device according to Variation 1 on Embodiment 1.

An information processing device according to Variation 1 on Embodiment 1 will be described next. FIG. 5 is a diagram schematically illustrating an example of operations of the information processing device according to Variation 1 on Embodiment 1. The descriptions in Variation 1 will focus upon differences from Embodiment 1. Note that descriptions of details which are the same as in Embodiment 1 will be simplified or omitted. Additionally, the configuration of the information processing device according to Variation 1 is the same as in Embodiment 1, and the descriptions will therefore refer to FIG. 1.

Information processing device 100 according to Variation 1 differs from information processing device 100 according to Embodiment 1 in that the setting of the processing by second detector 30 is a selection of second detector 30.

Based on the detection result of first detector 20, corrector 60 determines one detector among a plurality of detectors having different performances, and sets the determined detector as second detector 30.

As illustrated in FIG. 5, information processing device 100 according to Variation 1 determines the setting of the processing by second detector 30 when the first detection target which had been detected in the past (an n-2th frame) is no longer detected in the first image (the n-1th frame). For example, the setting of the processing is a selecting of a second detector. Each detector that is a candidate for selection is a detection model trained through machine learning, and has a different detection performance. The detection models may have different numbers of hidden layers, numbers of nodes, node weights, or the like in the neural network (NN). Information processing device 100 selects, from among these detection models, a detection model having higher performance than the detection model which had been used, and uses the selected detection model as second detector 30.

Note that the setting of the processing by second detector 30 may be computational resources allocated to the processing by second detector 30. Specifically, corrector 60 determines the computational resources allocated to the processing by second detector 30 based on the detection result of first detector 20. The computational resources may, for example, be an amount of computational resources allocated by a CPU or a GPU (Graphics Processing Unit), or a storage capacity such as cache memory.

For example, when the first detection target is no longer detected by first detector 20, corrector 60 determines more computational resources than the computational resources which have been allocated to second detector 30 up to that point. The processor allocates the determined computational resources to second detector 30.

At this time, corrector 60 may set an amount of data to be input to second detector 30. For example, corrector 60 may set an input data amount so that a resolution, size, or framerate of the data input to second detector 30 increases.

[Variation 2]

Figure 6:
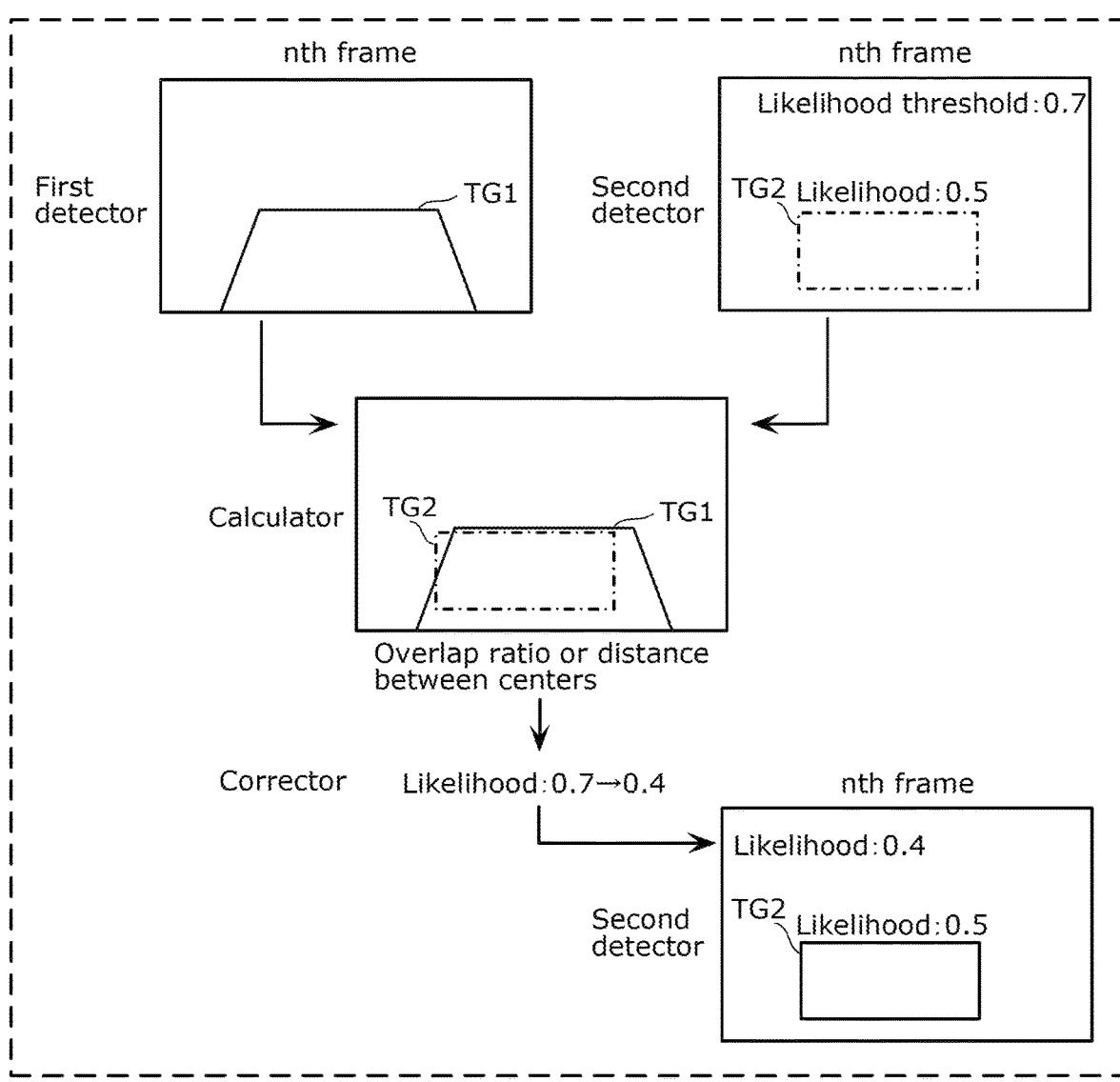
FIG. 6 is a diagram schematically illustrating an example of operations of an information processing device according to Variation 2 on Embodiment 1.

An information processing device according to Variation 2 on Embodiment 1 will be described next. FIG. 6 is a diagram schematically illustrating an example of operations of an information processing device according to Variation 2 on Embodiment 1. Like Variation 1, the descriptions in Variation 2 will focus upon differences from Embodiment 1. Note that descriptions of details which are the same as in Embodiment 1 will be simplified or omitted. Additionally, the configuration of the information processing device according to Variation 2 is the same as in Embodiment 1 and Variation 1, and the descriptions will therefore refer to FIG. 1.

With information processing device 100 according to Embodiment 1, the first detection target and the second detection target are the same type of object, but information processing device 100 according to Variation 2 differs from Embodiment 1 in that the first detection target and the second detection target are different types of objects.

For example, as illustrated in FIG. 6, the first detection target is a road surface, and the second detection target is, as in Embodiment 1, a person in a lying posture. First detector 20 and second detector 30 detect different detection targets in an image of the same frame.

As illustrated in FIG. 6, first detector 20 detects a detection target in an image of the nth frame, and second detector 30 detects a candidate frame having a predetermined likelihood (e.g., 0.5) for the second detection target in the image of the nth frame. At this time, calculator 50 calculates an overlap ratio or a distance between centers of a detection frame of the first detection target detected by first detector 20 and a candidate frame of the second detection target detected by second detector 30. Corrector 60 corrects the likelihood threshold for the second detection target in second detector 30 in accordance with the stated overlap ratio or distance between centers calculated by calculator 50. Corrector 60 changes a likelihood threshold of 0.7, which is pre-set in second detector 30, to a likelihood threshold of 0.4, in accordance with a result of the calculation by calculator 50. Through this, for example, an object which appears with low frequency, such as a person in a lying posture on a road surface, becomes easy to detect only in specific scenes, which increases the detection performance for that object. The ease of detection in scenes aside from the specific scenes does not change, and thus erroneous detections can be reduced.

Embodiment 2

An information processing device according to Embodiment 2 will be described next. In Embodiment 1 and the variations thereon, the setting of the processing by the second detector is determined based on the detection result of the first detector, but Embodiment 2 differs in that when the first detector is unstable, the first target is detected using the detection result of the second detector. The following descriptions will focus on points which are different from Embodiment 1 and the variations thereon. Note that in the following, the sensing data will be described as an image, in the same manner as in Embodiment 1.

Configuration

Figure 7:
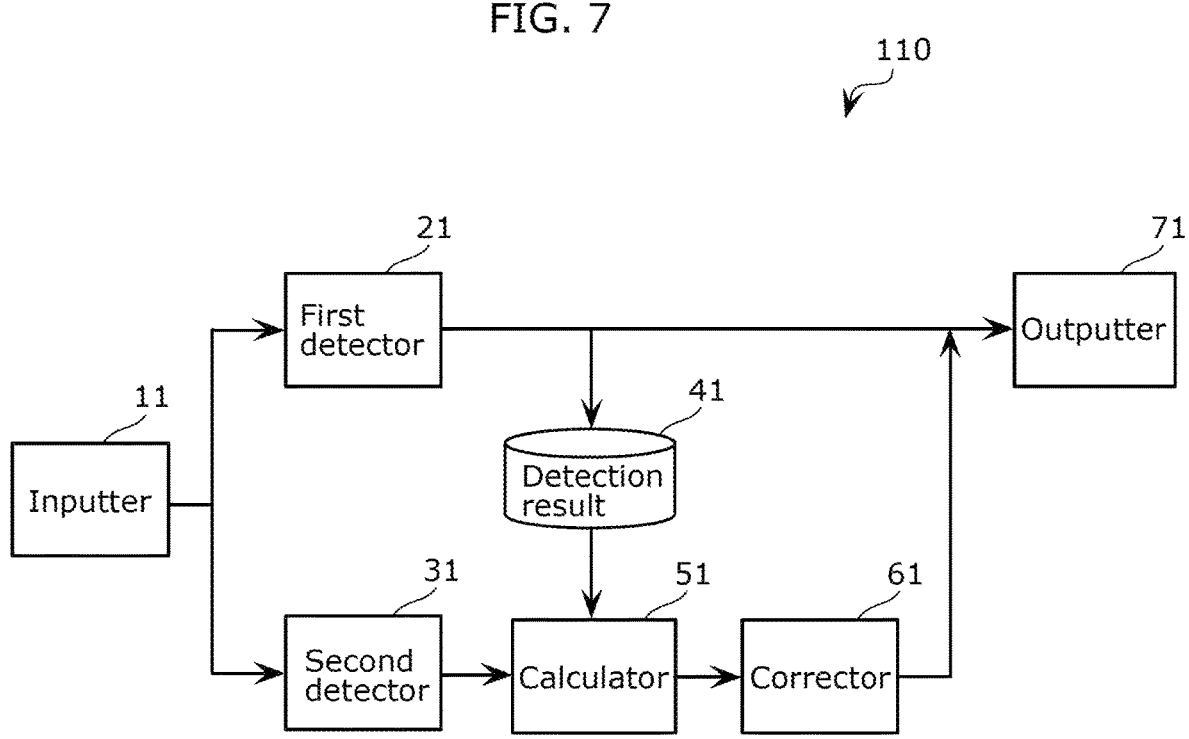
FIG. 7 is a block diagram illustrating an example of the configuration of an information processing device according to Embodiment 2.

FIG. 7 is a block diagram illustrating an example of the configuration of information processing device 110 according to Embodiment 2. As illustrated in FIG. 7, information processing device 110 is configured including inputter 11, first detector 21, second detector 31, detection result storage 41, calculator 51, corrector 61, and outputter 71.

Information processing device 110 may be realized by a computer configured including a processor and memory, for example. In this case, each constituent element of information processing device 110 may be realized by the processor executing at least one program stored in the memory. Additionally, information processing device 110 may be realized by a plurality of computers, each configured including a processor and memory and being capable of communicating with each other, operating cooperatively. In this case, each constituent element of information processing device 110 may be realized by at least one of the processors executing at least one program recorded in at least one of the memories. Here, like Embodiment 1, the descriptions will assume that information processing device 110 is realized by a computer configured including a processor and memory.

Inputter 11 is the same as inputter 10 in FIG. 1. First detector 21 and second detector 31 both detect a detection target in each of a plurality of images input from inputter 11. First detector 21 is a machine learning model trained, using machine learning, to detect the first detection target in an image. Additionally, second detector 31 is a machine learning model trained, using machine learning, to detect the second detection target in an image. First detector 21 and second detector 31 may be mutually-different machine learning models, or may be a single machine learning model.

The first detection target and the second detection target are objects which are of the same type but have different parts. The first detection target is a target for which accurate detection is difficult due to poor sensing conditions of the sensor, e.g., in the case of an image sensor, poor image capturing conditions. On the other hand, the second detection target is a target for which erroneous detections due to sensing conditions of the sensor, for example, are less likely to occur than for the first detection target. A situation where, for example, rain is falling at a time of day when vehicles have their headlights on, and a pedestrian has been illuminated by a vehicle's headlights, is conceivable as "poor image capturing conditions". At this time, the light may be reflected by puddles on the road surface and the like, and a candidate frame in the image may change in the vertical direction and be detected at a larger size than normal. For example, the type of both the first detection target and the second detection target is "pedestrian", but the first detection target is the entire body of the pedestrian, whereas the second detection target is the upper body of the pedestrian.

First detector 21 detects the first detection target in each of a plurality of images. For example, first detector 21 may track the first detection target in a plurality of sequential images. This makes it possible for first detector 21 to track the first detection target in time series. Second detector 31 tracks an upper half of the first detection target detected by first detector 21. The tracking of the first detection target and the second detection target may be executed using a tracking threshold that defines a number of frames until the detection frame is finalized, or may be executed using a tracking threshold that defines a number of frames until the detection frame is deleted.

Detection result storage 41 stores the detection result of first detector 21. Detection result storage 41 is the same as detection result storage 40 in Embodiment 1, and will therefore not be described here.

Calculator 51 calculates a degree of change between the detection result of the first detection target in the first image and the detection result of the first detection target in the second image. This degree of change is the degree of a change in a specific direction in the image, between the detection result of the first detection target in the first image and the detection result of the first detection target in the second image. Calculator 51 reads out the detection result of first detector 21 from detection result storage 41 and, for example, calculates a difference in vertical direction sizes of the detection result of the first detection target in the first image and the detection result of the first detection target in the second image. To be more specific, calculator 51 tracks the detection result of first detector 21, and calculates a vertical direction size of the detection frame of the first detection target in the second image, which corresponds to the detection frame of the first detection target in the first image. Then, calculator 51 calculates a difference in the vertical direction sizes of the detection frame of the first detection target in the first image, and the detection frame of the first detection target in the second image corresponding to the detection frame of the first detection target in the first image.

Based on a result of the calculation by calculator 51, corrector 61 selects (i) one of the detection result of the first detection target in the second image and a detection result based on processing result from second detector 31 as the detection result of the first detection target in the second image. Specifically, when the difference calculated by calculator 51 is less than a threshold, corrector 61 determines the detection result of first detector 21 as the detection result of the first detection target in the second image. On the other hand, when the stated difference is at least the threshold, corrector 61 determines the detection result based on the processing result from second detector 31 as the detection result of the first detection target in the second image. For example, corrector 61 generates a candidate frame by extending the detection frame of the second detection target, detected by second detector 31 in the second image, X times, e.g., double, in the vertical direction. Then, corrector 61 determines the generated candidate frame as the detection result (i.e., the detection frame) of the first detection target in the second image.

Additionally, based on the result calculated by calculator 51, corrector 61 may (ii) determine a way of integrating the detection result of second detector 31 and the detection result of first detector in the second image, and then perform the integrating. Specifically, in accordance with the difference calculated by calculator 51, corrector 61 determines a weight of each of the detection result of first detector 21 and the detection result of second detector 31. For example, corrector 61 makes the weight of the detection result of first detector 21 relatively lower as the difference increases, and makes the weight of the detection result of first detector 21 relatively higher as the difference decreases. Then, corrector 61 integrates the detection results of first detector 21 and second detector 31 in accordance with the weights. For example, corrector 61 calculates a weighted average of coordinate values of the respective detection frames. A result of the calculation is then determined as the detection result of the first detection target.

Note that the selection in the foregoing (i) may be executed using the stated weights. For example, corrector 61 may determine the detection result having the higher weight as the detection result of the first detection target.

Outputter 71 may obtain the detection result of the first detection target determined by corrector 61 and output the detection result to a presenter (not shown), an information terminal, another processing device aside from information processing device 110, or the like.

Operations

An example of operations performed by information processing device 110 according to Embodiment 2 will be described hereinafter. Here, only the differences from Embodiment 1 will be described.

Figure 8:
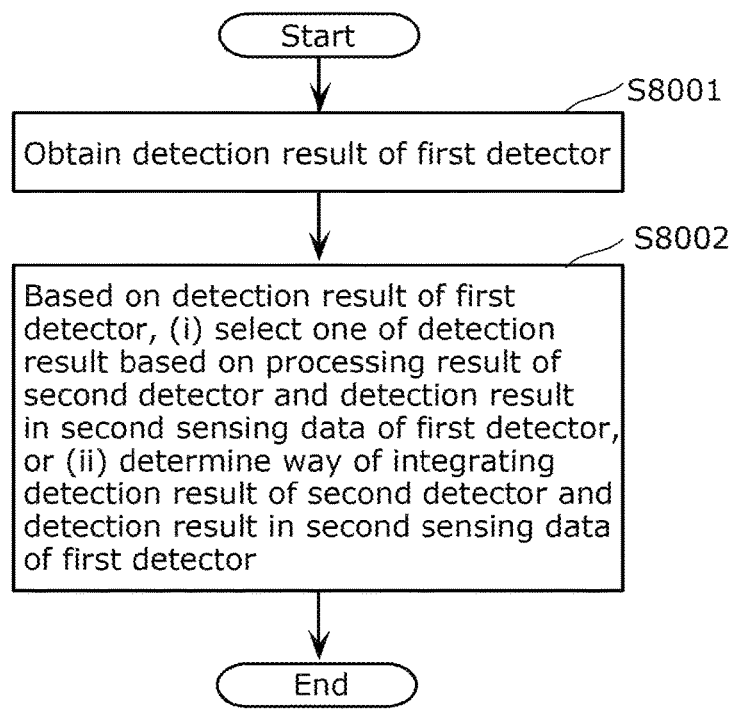
FIG. 8 is a flowchart illustrating an example of operations performed by a calculator and a corrector of the information processing device according to Embodiment 2.
Figure 9:
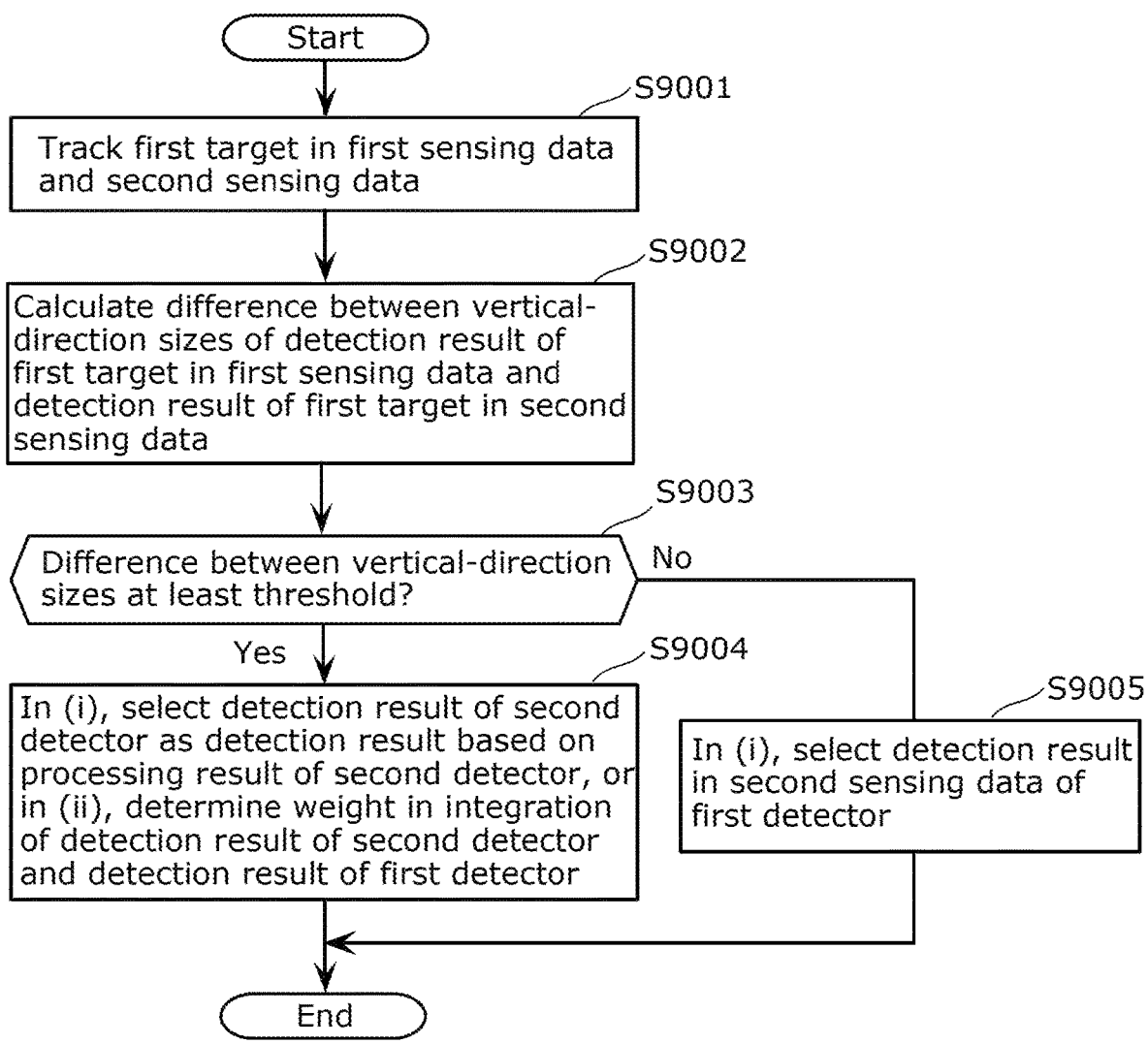
FIG. 9 is a flowchart illustrating details of processing of step S8002 in FIG. 8.
Figure 10:
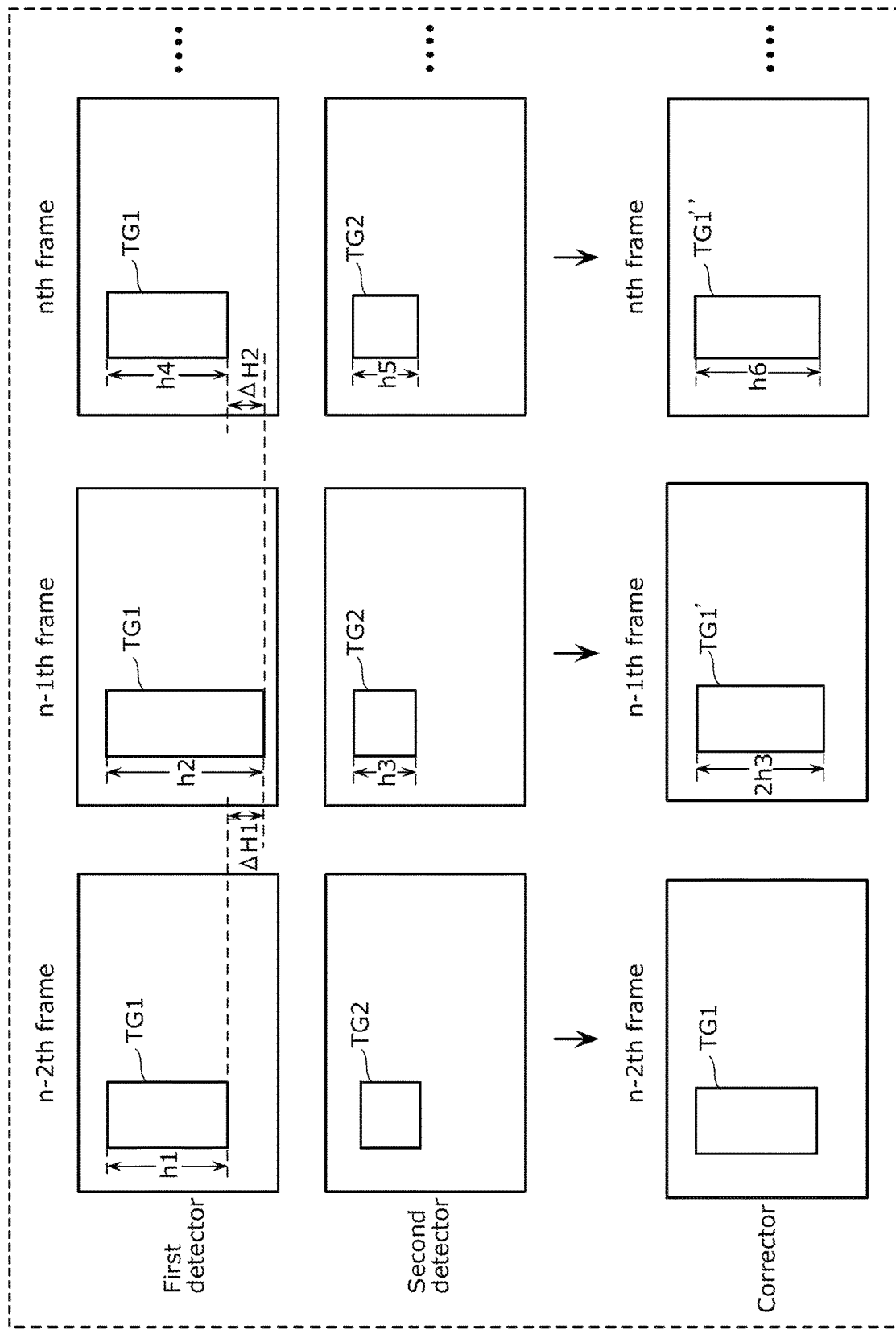
FIG. 10 is a diagram schematically illustrating an example of operations of the information processing device according to Embodiment 2.

FIG. 8 is a flowchart illustrating an example of operations performed by calculator 51 and corrector 61 of information processing device 110 according to Embodiment 2. FIG. 9 is a flowchart illustrating details of processing of step S8002 in FIG. 8. FIG. 10 is a diagram schematically illustrating an example of operations of information processing device 110 according to Embodiment 2.

As illustrated in FIG. 8, information processing device 110 obtains the detection result of first detector 21 for detecting the first detection target in the first image (step S8001). For example, as illustrated in FIG. 10, first detector 21 detects detection frame TG1 of the first detection target in the n-2th frame (the first image), and detects detection frame TG1 of the first detection target in the n-1th frame (second image) next in order after the first image. These detection results are, for example, associated with the image and information such as coordinates of the detection frame in the image, and are stored in detection result storage 41. Calculator 51 reads out and obtains these detection results from detection result storage 41.

Next, based on the detection result of first detector 21, information processing device 110 (i) selects one detection result among a detection result based on a processing result of second detector 31 for detecting the second detection target, which is different from the first detection target, in the second image next in an order after the first image and the detection result of first detector 21 in the second image, or (ii) determines a way of integrating the detection result based on the processing result of second detector 31 and the detection result of first detector 21 in the second image (step S8002). At this time, information processing device 110 may calculate the degree of change between the detection result of the first detection target in the first image and the detection result of the first detection target in the second image, and execute the stated (i) or (ii) based on the degree of change. Note that the degree of change is the degree of a change in a specific direction in the image, between the detection result of the first detection target in the first image and the detection result of the first detection target in the second image. In accordance with the degree of change in the specific direction, information processing device 110 may, in the stated (i), select one detection result among the detection result based on the processing result of second detector 31 and the detection result of first detector 21 in the second image, or, in the stated (ii), may determine a weight of the integrating of the detection result based on the processing result of second detector 31 and the detection result of first detector 21, and perform the integration. At this time, for example, in the stated (i), the detection result having the higher of the weights used in the integrating of the two detection results may be selected, and in the stated (ii), a weighted average of the coordinate values of the respective detection frames may be calculated, and a result of the calculation may be output as the detection result of the first detection target. The weighting in the integrating has already been described above, and will therefore not be mentioned here.

Step S8002 will be described in more detail with reference to FIG. 9 and FIG. 10. As illustrated in FIG. 9, calculator 51 tracks the first detection target in the first image and the second image (step S9001), and calculates a difference in the vertical direction sizes of the detection result of the first detection target in the first image and the detection result of the first detection target in the second image (step S9002). To be more specific, as illustrated in FIG. 10, difference ΔH1, between vertical direction size h1 of detection frame TG1 of the first detection target in the first image (the n-2th frame) and vertical direction size h2 of detection frame TG1 of the first detection target in the second image (the n-1th frame), is calculated.

Next, corrector 61 determines whether or not difference ΔH1 between the vertical direction sizes, calculated by calculator 51, is at least a threshold (step S9003). When difference ΔH1 is less than the threshold (No in step S9003), corrector 61 selects the detection result of first detector 21 in the second image, i.e., detection frame TG1, in the stated (i) (step S9005). Alternatively, in the stated (in, the detection result of first detector 21 may be selected by setting the weight of the detection result of second detector 31 to zero.

On the other hand, when difference ΔH1 is at least the threshold (Yes in step S9003), in the stated (i), corrector 61 selects the detection result based on the processing result of second detector 31 as the detection result of first detector 21. Alternatively, in the stated (ii), the weighting in the integrating of the detection result based on the processing result of second detector 31 and the detection result of first detector 21 is determined (step S9004).

An example of the stated (i) will be described first, using the n-1th frame as an example. Here, the detection result based on the processing result of second detector 31 is, for example, candidate frame TG1' (having vertical direction size $2h3$) of the first detection target, generated by extending the detection frame (having vertical direction size h3) of the second detection target detected by second detector 31 by X times, e.g., double, in the vertical direction, as indicated by the n-1th frame in the "corrector" row in FIG. 10. In the processing of step S9004, corrector 61 selects the frame having the higher integrating weight among detection frame TG1 of the first detection target detected by first detector 21 and candidate frame TG1' corresponding to the first detection target. For example, as indicated by the n-1th frame in the "corrector" row in FIG. 10, in the stated (i), candidate frame TG1' of the first detection target is selected to be output.

An example of the stated (ii) will be described next, using the nth frame as an example. In the processing of step S9004, corrector 61 determines the integration weights of candidate frame TG1' of the first detection target, generated based on the detection result of second detector 31, and detection frame TG1 of the first detection target, which is the detection result of first detector 21, in accordance with the stated difference. Then, using the determined weights, corrector 61 calculates a weighted average of the coordinate values of detection frame TG1 of the first detection target detected by first detector 21 and candidate frame TG1' of the first detection target. For example, corrector 61 determines the weights of detection frame TG1 (having vertical direction size h4) of first detector 21, and candidate frame TG1' (having vertical direction size $2h5$) based on detection frame TG2 (having vertical direction size h5) of second detector 31, illustrated in FIG. 10, in accordance with difference ΔH2. Then, using the determined weights, corrector 61 calculates a weighted average of the coordinates of TG1 and TG1', and generates candidate frame TG1" (having vertical direction size h6) of the first detection target. The generated candidate frame TG1" is then output.

Corrector 61 determines the frame determined through either one of the stated (i) and (ii) as the detection result of the first detection target in the second image.

Other Embodiments

Although one or more aspects of an information processing device, an information processing method, and a program have been described thus far on the basis of embodiments, the present disclosure is not intended to be limited to these embodiments. Variations on the present embodiment conceived by one skilled in the art and embodiments implemented by combining constituent elements from different other embodiments, for as long as they do not depart from the essential spirit thereof, fall within the scope of the present disclosure.

For example, the processing described in the foregoing embodiments may be implemented through centralized processing using a single device (system), or may be implemented through distributed processing using a plurality of devices. Additionally, a single processor or a plurality of processors may execute the above-described programs stored in the recording medium. In other words, the processing may be centralized processing or distributed processing.

Additionally, many changes, substitutions, additions, omissions, and the like are possible for the foregoing embodiments without departing from the scope of the claims or a scope equivalent thereto.

INDUSTRIAL APPLICABILITY

The present disclosure can be used as an information processing device capable of improving the detection accuracy of detection targets which are difficult to detect, and can be used in, for example, in-vehicle camera systems, security camera systems, and the like.

The invention claimed is:
1. A detection device comprising a processor,
wherein the processor is configured to:
obtain a detection result of a first detector for detecting a first target in first sensing data;
obtain a candidate for a detection result of a second detector for detecting a second target in second sensing data next in an order after the first sensing data, the second target being different from the first target, the candidate being a candidate of a region of the second target in the second sensing data detected by the second detector; and
based on a relationship between the detection result of the first detector and the candidate for the detection result of the second detector, determine a setting of processing by the second detector, the setting being a setting for detecting the second target in the second sensing data,
the second sensing data comprises an nth frame, where n is greater than or equal to 2, in a video including images, and the first sensing data comprises an n-mth frame, where m is greater than or equal to 1 and less than n, and the first target and the second target are objects which are of a same type, and (i) have different orientations or postures or (ii) are different parts of a single object respectively in the first sensing data and the second sensing data.

2. The detection device according to claim 1,
wherein the relationship is a distance between a region of the first target detected by the first detector and the candidate region of the second target detected by the second detector.

3. The detection device according to claim 1,
wherein the processor determines the setting of the processing by the second detector in accordance with whether or not the first target has been detected in the first sensing data.

4. The detection device according to claim 3,
wherein the processor determines the setting of the processing by the second detector in accordance with whether or not the first target has been detected in the second sensing data.

5. The detection device according to claim 3,
wherein the processor determines the setting of the processing by the second detector when the first target is detected in the first sensing data.

6. The detection device according to claim 5,
wherein the processor determines the setting of the processing by the second detector when the first target is furthermore not detected in the second sensing data.

7. The detection device according to claim 3,
wherein the processor determines the setting of the processing by the second detector when the first target is no longer detected in the first sensing data.

8. The detection device according to claim 1,
wherein the setting of the processing is a parameter used in the processing.

9. The detection device according to claim 8,
wherein the parameter used in the processing is a likelihood threshold, a correction degree of a likelihood, or a tracking threshold that is a number of data for determining whether a detection has been made, for the second target.

10. The detection device according to claim 1,
wherein the setting of the processing is a calculation resource allocated to the processing by the second detector.

11. The detection device according to claim 1,
wherein the setting of the processing is the second detector being selected.

12. The detection device according to claim 1,
wherein the setting of the processing is a resolution, a size, or a framerate of data input to the second detector.

13. The detection device according to claim 1,
wherein the first target and the second target are the objects having the same type and having the different postures.

14. A detection method to be executed by a computer, the method comprising:
obtaining a detection result of a first detector for detecting a first target in first sensing data;
obtaining a candidate for a detection result of a second detector for detecting a second target in second sensing data next in an order after the first sensing data, the second target being different from the first target, the candidate being a candidate of a region of the second target in the second sensing data detected by the second detector; and
based on a relationship between the detection result of the first detector and the candidate for the detection result of the second detector, determining a setting of processing by the second detector, the setting being a setting for detecting the second target in the second sensing data,
wherein the second sensing data comprises an nth frame, where n is greater than or equal to 2, in a video including images, and the first sensing data comprises an n-mth frame, where m is greater than or equal to 1 and less than n, and
the first target and the second target are objects which are of a same type, and (i) have different orientations or postures or (ii) are different parts of a single object respectively in the first sensing data and the second sensing data.

15. A non-transitory computer-readable recording medium having a program for causing a computer to execute a detection method, the method comprising:
obtaining a detection result of a first detector for detecting a first target in first sensing data;
obtaining a candidate for a detection result of a second detector for detecting a second target in second sensing data next in an order after the first sensing data, the second target being different from the first target, the candidate being a candidate of a region of the second target in the second sensing data detected by the second detector; and
based on a relationship between the detection result of the first detector and the candidate for the detection result of the second detector, determining a setting of processing by the second detector, the setting being a setting for detecting the second target in the second sensing data,
wherein the second sensing data comprises an nth frame, where n is greater than or equal to 2, in a video including images, and the first sensing data comprises an n-mth frame, where m is greater than or equal to 1 and less than n, and
the first target and the second target are objects which are of a same type, and (i) have different orientations or postures or (ii) are different parts of a single object respectively in the first sensing data and the second sensing data.

* * * * *